US009307295B2

United States Patent
Chan

(10) Patent No.: US 9,307,295 B2
(45) Date of Patent: Apr. 5, 2016

(54) LIVE MEDIA CONTENT DISCOVERY AND MANAGEMENT

(75) Inventor: Christopher Chan, San Francisco, CA (US)

(73) Assignee: MobiTV, Inc., Emeryville, CA (US)

( * ) Notice: Subject to any disclaimer, the term of this patent is extended or adjusted under 35 U.S.C. 154(b) by 0 days.

(21) Appl. No.: 13/362,674

(22) Filed: Jan. 31, 2012

(65) Prior Publication Data

US 2012/0198497 A1     Aug. 2, 2012

Related U.S. Application Data

(60) Provisional application No. 61/438,591, filed on Feb. 1, 2011.

(51) Int. Cl.
*H04N 5/445* (2011.01)
*G06F 3/00* (2006.01)
*G06F 13/00* (2006.01)
*H04N 21/482* (2011.01)
*H04N 21/414* (2011.01)
*H04N 21/472* (2011.01)

(52) U.S. Cl.
CPC ..... *H04N 21/4821* (2013.01); *H04N 21/41407* (2013.01); *H04N 21/47214* (2013.01)

(58) Field of Classification Search
None
See application file for complete search history.

(56) References Cited

U.S. PATENT DOCUMENTS

| | | | |
|---|---|---|---|
| 6,522,342 B1 * | 2/2003 | Gagnon et al. | 715/716 |
| 7,478,414 B1 * | 1/2009 | Glusker et al. | 725/9 |
| 2004/0266336 A1 * | 12/2004 | Patsiokas et al. | 455/3.04 |
| 2006/0031880 A1 * | 2/2006 | Stark et al. | 725/45 |
| 2006/0148528 A1 * | 7/2006 | Jung et al. | 455/566 |
| 2007/0107015 A1 * | 5/2007 | Kazama et al. | 725/58 |
| 2007/0192793 A1 * | 8/2007 | Song et al. | 725/39 |
| 2009/0007198 A1 * | 1/2009 | Lavender et al. | 725/91 |
| 2010/0031193 A1 * | 2/2010 | Stark et al. | 715/810 |
| 2010/0114857 A1 * | 5/2010 | Edwards et al. | 707/709 |
| 2010/0220978 A1 * | 9/2010 | Ogikubo | 386/95 |
| 2010/0267370 A1 * | 10/2010 | Lee | 455/414.1 |

OTHER PUBLICATIONS

Harrison, Chris, et al., "iEPG: An Ego-Centric Electronic Program Guide and Recommendation Interface," Proceedings of the 1$^{st}$ International Conference on Designing Interactive User Experiences for TV and Video,(Oct. 22-24, 2008), p. 23-26.

Pallara, Lorenzo, "EPG: Electronic Program Guide," AVALPA Digital Engineering Srl, Bologna, Italy, (Mar. 2, 2011), 31 pgs.

* cited by examiner

*Primary Examiner* — Nasser Goodarzi
*Assistant Examiner* — Adil Ocak
(74) *Attorney, Agent, or Firm* — Kwan & Olynick LLP

(57) ABSTRACT

Mechanisms are provided for allowing a user to linearly or non-linearly discover and navigate media content including live events. A smart timeline includes panels of event information, previews, images, etc. Moving ahead allows discovery of future live media content and events and uncovers mechanisms for setting notifications and reminders. Moving back in time allows discovery of past events and mechanisms for replaying past video and audio content. Event navigation mechanisms can be integrated with calendaring applications to post and select events discovered using event navigation mechanisms.

20 Claims, 5 Drawing Sheets

LIVE MEDIA CONTENT DISCOVERY AND MANAGEMENT

CROSS-REFERENCE TO RELATED APPLICATION

This application claims the benefit of priority under 35 U.S.C. §119(e) to U.S. Provisional Application No. 61/438,591, titled "LIVE MEDIA CONTENT DISCOVERY AND MANAGEMENT," filed Feb. 1, 2011, which is incorporated in its entirety by this reference for all purposes.

DESCRIPTION OF RELATED ART

The present disclosure relates to media content discovery, navigation, and management.

Conventional list based electronic program guides provide users with information to allow video content selection. Some electronic program guides provide hundreds or thousands of options including numerous channels and video on demand clips. However, mechanisms for sorting through the options and selecting video content are limited. Consequently, the techniques and mechanisms of the present invention provide linear and non-linear mechanisms to efficiently browse media content including live video events.

OVERVIEW

Mechanisms are provided for allowing a user to linearly or non-linearly discover and navigate media content including live events. A smart timeline includes panels of event information, previews, images, etc. Moving ahead allows discovery of future live media content and events and uncovers mechanisms for setting notifications and reminders. Moving back in time allows discovery of past events and mechanisms for replaying past video and audio content. Event navigation mechanisms can be integrated with calendaring applications to post and select events discovered using event navigation mechanisms.

These and other features of the present invention will be presented in more detail in the following specification of the invention and the accompanying figures, which illustrate by way of example the principles of the invention.

BRIEF DESCRIPTION OF THE DRAWINGS

The disclosure may best be understood by reference to the following description taken in conjunction with the accompanying drawings, which illustrate particular embodiments of the present invention.

DESCRIPTION OF PARTICULAR EMBODIMENTS

Figure 1:
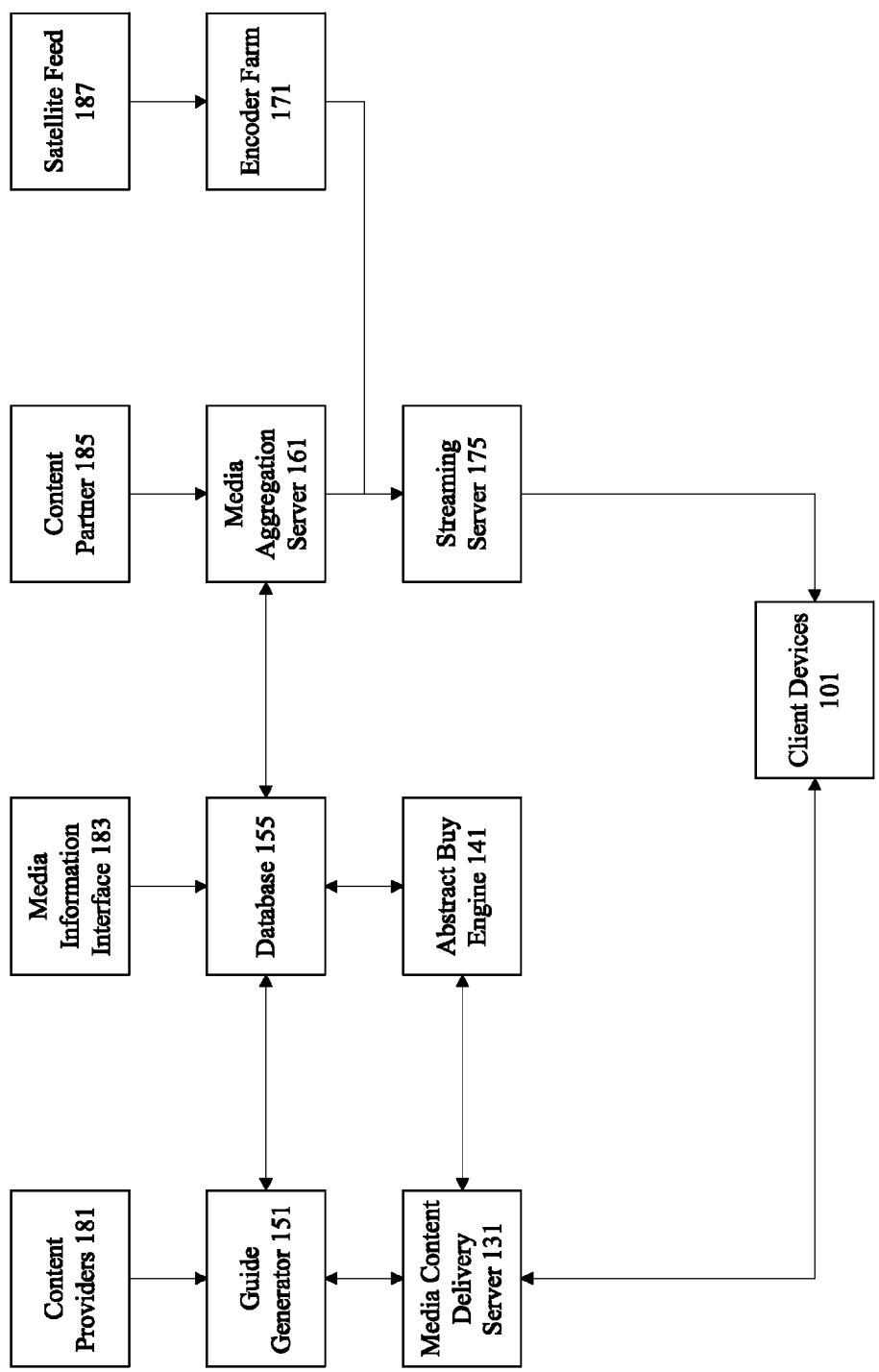
FIG. 1 illustrates a particular example of a network that can use the techniques and mechanisms of the present invention.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular devices such as mobile devices. However, it should be noted that the techniques and mechanisms of the present invention can be used with a variety of devices including general computing devices. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a processor is used in a variety of contexts. However, it will be appreciated that multiple processors can also be used while remaining within the scope of the present invention unless otherwise noted. Furthermore, the techniques and mechanisms of the present invention will sometimes describe two entities as being connected. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Selecting video content on a device such as a mobile phone or a portable computing device can often be inefficient. In many instances, subscription packages provide hundreds of channels and thousands of video on demand clips. It is difficult for a user to identify interesting or exciting content. In some instances, electronic program guides can organize content by category, such as dramas, sports, or movies and provide the content in numerically ordered channel listings. In some other instances, popular programs or award winning content is flagged for a user. Electronic program guides may also be filtered. In some examples, non-family oriented programming is filtered based on user selection.

However, providing thousands of channels and video clips to a user results in a large of amount of information and choices. This information may be shown in a part of a display or condensed onto a device screen. The information may scroll automatically or may scroll after user input. In many instances, channels and video clips may be listed in numerical order or alphabetical order. In either case, it takes a tremendous amount of time to sift through content, and even after viewing the entries, a user still may have insufficient information to make an intelligent selection.

Consequently, the techniques and mechanisms of the present invention present a tile based mechanism for displaying content for user selection and management. A user can efficiently view options. Tiles may be personalized for particular user based on user preferences, user characteristics, social networking buzz, popularity, ratings, etc. Tiles may correspond not only to particular channels or programs, but may correspond with purchase offers, information, series information, premium subscription offers, etc. Each tile may have multiple selection options including in application purchase, archive program viewing, additional content viewing, etc. Tiles themselves may be still images, icons, logos, or live channel feeds. Using the live channel as a background, a lightweight menu-driven navigation system can be used to position an overlay indicator to select video content. Alternatively, numeric or text based navigation schemes could also be used.

According to particular embodiments, tiles include video content such as live video content, looped clip content, trailers, advertisements, etc. Tiles may also user selected live channels of both live and on-demand or clip content. The live content and clip streams can be arranged into a variety of visual patterns are possible. In particular examples, tiles are dynamically changing based on popularity and viewership information.

Tiles can be displayed on a user device in an efficient and effective manner. According to particular embodiments, a relatively lightweight client side application provides an interface for a user to navigate tiles. In some examples, a tile may allow navigation to numerous other tiles. In particular examples, numeric or text selection mechanisms can be provided to select channel content. For example, particular numeric or text codes can be mapped to particular streams displayed in tiles.

FIG. 1 is a diagrammatic representation showing one example of a network that can use the techniques of the present invention. According to various embodiments, media content is provided from a number of different sources 185. Media content may be provided from film libraries, cable companies, movie and television studios, commercial and business users, etc. and maintained at a media aggregation server 161. Any mechanism for obtaining media content from a large number of sources in order to provide the media content to mobile devices in live broadcast streams is referred to herein as a media content aggregation server. The media content aggregation server 161 may be clusters of servers located in different data centers. According to various embodiments, content provided to a media aggregation server 161 is provided in a variety of different encoding formats with numerous video and audio codecs. Media content may also be provided via satellite feed 157.

An encoder farm 171 is associated with the satellite feed 187 and can also be associated with media aggregation server 161. The encoder farm 171 can be used to process media content from satellite feed 187 as well as possibly from media aggregation server 161 into potentially numerous encoding formats. According to various embodiments, file formats include open standards MPEG-1 (ISO/IEC 11172), MPEG-2 (ISO/IEC 13818-2), MPEG-4 (ISO/IEC 14496), as well as proprietary formats QuickTime™, ActiveMovie™, and RealVideo™. Some example video codecs used to encode the files include MPEG-4, H.263, and H.264. Some example audio codecs include Qualcomm Purevoice™ (QCELP), The Adaptive Multi—Narrow Band (AMR-NB), Advanced Audio coding (AAC), and AACPlus. The media content may also be encoded to support a variety of data rates. The media content from media aggregation server 161 and encoder farm 171 is provided as live media to a streaming server 175. In one example, the streaming server is a Real Time Streaming Protocol (RTSP) server 175. Media streams are broadcast live from an RTSP server 175 to individual client devices 101. A variety of protocols can be used to send data to client devices.

Possible client devices 101 include personal digital assistants (PDAs), cellular phones, personal computing devices, personal computers etc. According to various embodiments, the client devices are connected to a cellular network run by a cellular service provider. IN other examples, the client devices are connected to an Internet Protocol (IP) network. Alternatively, the client device can be connected to a wireless local area network (WLAN) or some other wireless network. Live media streams provided over RTSP are carried and/or encapsulated on one of a variety of wireless networks.

The client devices are also connected over a wireless network to a media content delivery server 131. The media content delivery server 131 is configured to allow a client device 101 to perform functions associated with accessing live media streams. For example, the media content delivery server allows a user to create an account, perform session identifier assignment, subscribe to various channels, log on, access program guide information, obtain information about media content, etc. According to various embodiments, the media content delivery server does not deliver the actual media stream, but merely provides mechanisms for performing operations associated with accessing media. In other implementations, it is possible that the media content delivery server also provides media clips, files, and streams. The media content delivery server is associated with a guide generator 151. The guide generator 151 obtains information from disparate sources including content providers 181 and media information sources 183. The guide generator 151 provides program guides to database 155 as well as to media content delivery server 131 to provide to client devices 101.

According to various embodiments, the guide generator 151 obtains viewership information from individual client devices. In particular embodiments, the guide generation 151 compiles viewership information in real-time in order to generate a most-watched program guide listing most popular programs first and least popular programs last. The client device 101 can request program guide information and the most-watched program guide can be provided to the client device 101 to allow efficient selection of video content. According to various embodiments, guide generator 151 is connected to a media content delivery server 131 that is also associated with an abstract buy engine 141. The abstract buy engine 141 maintains subscription information associated with various client devices 101. For example, the abstract buy engine 141 tracks purchases of premium packages.

The media content delivery server 131 and the client devices 101 communicate using requests and responses. For example, the client device 101 can send a request to media content delivery server 131 for a subscription to premium content. According to various embodiments, the abstract buy engine 141 tracks the subscription request and the media content delivery server 131 provides a key to the client device 101 to allow it to decode live streamed media content. Similarly, the client device 101 can send a request to a media content delivery server 131 for a most-watched program guide for its particular program package. The media content delivery server 131 obtains the guide data from the guide generator 151 and associated database 155 and provides appropriate guide information to the client device 101.

Although the various devices such as the guide generator 151, database 155, media aggregation server 161, etc. are shown as separate entities, it should be appreciated that various devices may be incorporated onto a single server. Alternatively, each device may be embodied in multiple servers or clusters of servers. According to various embodiments, the guide generator 151, database 155, media aggregation server 161, encoder farm 171, media content delivery server 131, abstract buy engine 141, and streaming server 175 are included in an entity referred to herein as a media content delivery system.

Figure 2:
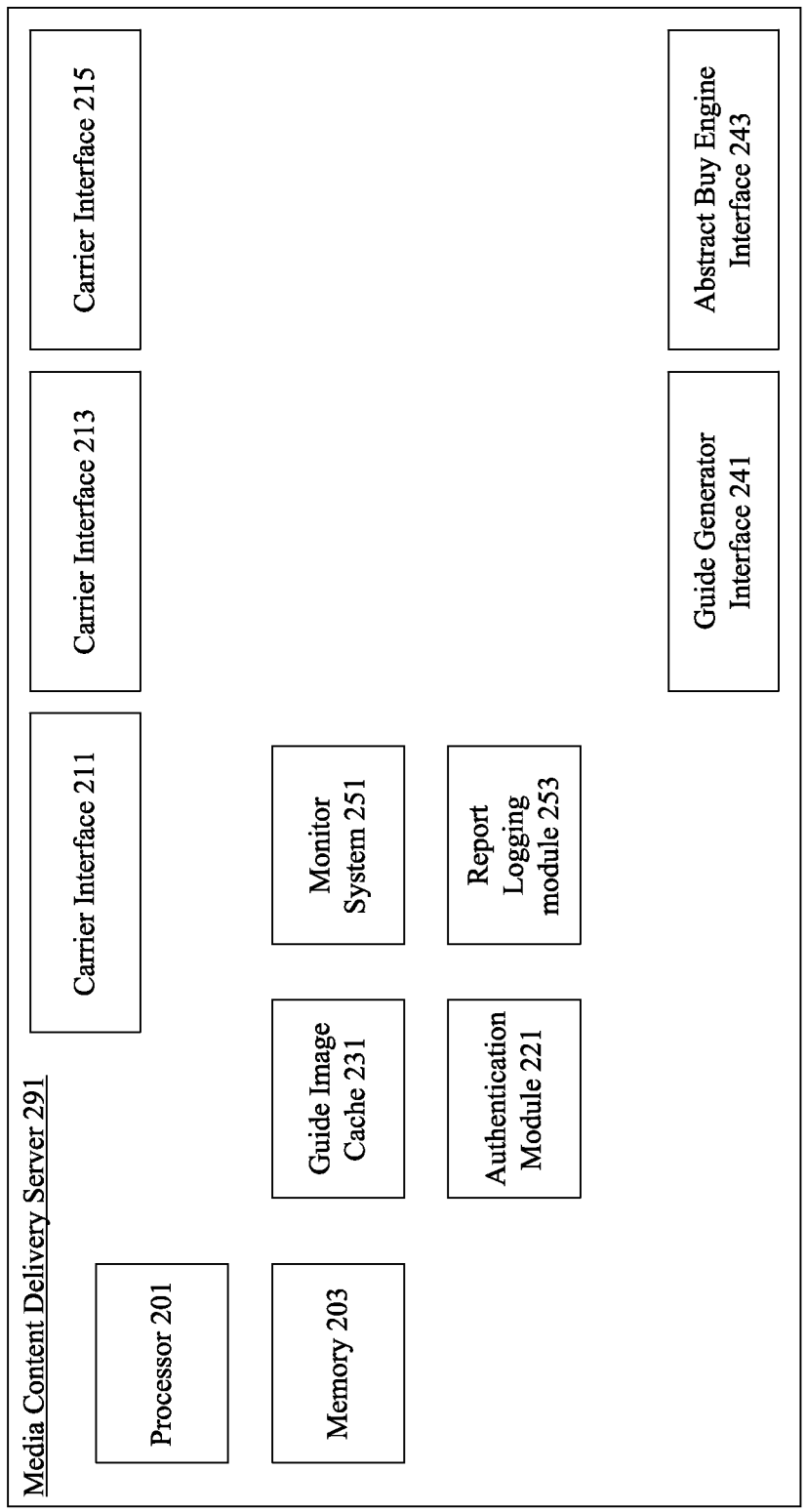
FIG. 2 illustrates a particular example of a content delivery system.

FIG. 2 is a diagrammatic representation showing one example of a media content delivery server 291. According to various embodiments, the media content delivery server 291 includes a processor 201, memory 203, and a number of interfaces. In some examples, the interfaces include a guide generator interface 241 allowing the media content delivery server 291 to obtain program guide information. The media content delivery server 291 also can include a program guide cache 231 configured to store program guide information and data associated with various channels. The media content delivery server 291 can also maintain static information such as icons and menu pages. The interfaces also include a carrier interface 211 allowing operation with mobile devices such as cellular phones operating in a particular cellular network. The carrier interface allows a carrier vending system to update subscriptions. Carrier interfaces 213 and 215 allow operation with mobile devices operating in other wireless networks. An abstract buy engine interface 243 provides communication with an abstract buy engine that maintains subscription information.

An authentication module 221 verifies the identity of mobile devices. A logging and report generation module 253 tracks mobile device requests and associated responses. A monitor system 251 allows an administrator to view usage patterns and system availability. According to various embodiments, the media content delivery server 291 handles requests and responses for media content related transactions while a separate streaming server provides the actual media streams. In some instances, a media content delivery server 291 may also have access to a streaming server or operate as a proxy for a streaming server. But in other instances, a media content delivery server 291 does not need to have any interface to a streaming server. In typical instances, however, the media content delivery server 291 also provides some media streams. The media content delivery server 291 can also be configured to provide media clips and files to a user in a manner that supplements a streaming server.

Although a particular media content delivery server 291 is described, it should be recognized that a variety of alternative configurations are possible. For example, some modules such as a report and logging module 253 and a monitor 251 may not be needed on every server. Alternatively, the modules may be implemented on another device connected to the server. In another example, the server 291 may not include an interface to an abstract buy engine and may in fact include the abstract buy engine itself. A variety of configurations are possible.

Figure 3:
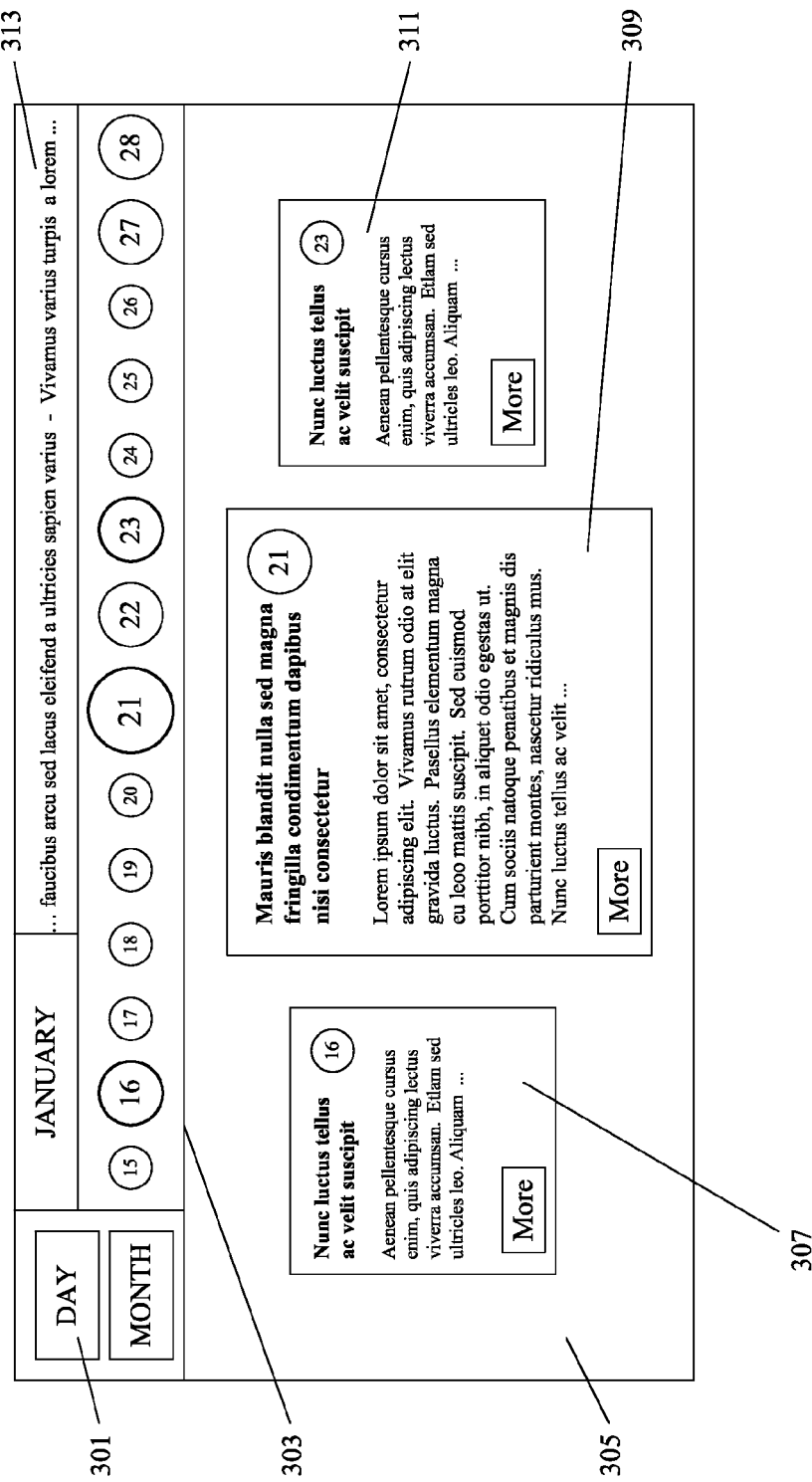
FIG. 3 illustrates a particular example of a live event discovery and navigation mechanism.

FIG. 3 illustrates a particular example of a live event navigation system. The navigation system includes a day versus month selector 301. According to various embodiments, the day selector is default. A scrollable dates area 303 allows users to view events for each day of the month. In particular embodiments, an events area 305 scrolls with a day selector area. The scrollable events area includes information about a past event 307. According to various embodiments, a featured event for the day is depicted at 309 and a future event is depicted at 311. A ticker 313 provides a location to display marketing messages.

An event can be any media (text, video, audio, photo) that occurs in a given place and time. A navigational paradigm is extensible across media delivery platforms such as mobile phones, tablet computers, personal computers, set-top-boxes, and internet enabled televisions.

According to various embodiments, multiple events for the same day may be displayed as tiles in a windows, scrollable images, thumbnails of various sizes, etc. In particular embodiments, tiles of various sizes based on real-time popularity of various events are displayed. In some examples, larger tiles correspond to more popular events in a window.

Events could be integrated into a calendaring application. In some examples, a user may specify particular events for calendaring and scheduling. Reminders may be triggered when an event approaches and automatically displayed when an item is selected in a calendar application.

Figure 4:
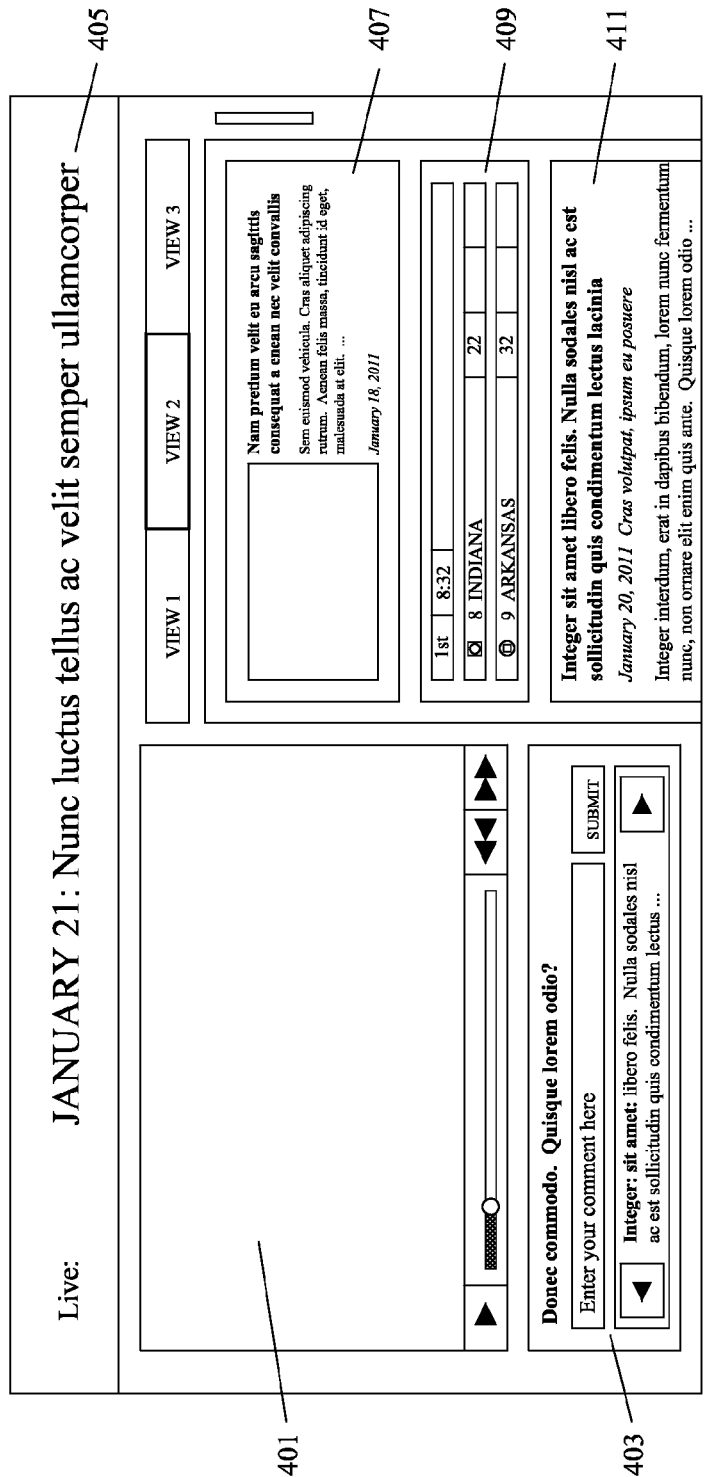
FIG. 4 illustrates even navigation.

FIG. 4 illustrates one example of an event view. An event view window 401 displays media content. According to various embodiments, a social network interface shows a live feed of individuals commenting on media content. A user can also make live comments about a particular piece of media content. A header bar 405 shows an event name, date, and time. A related event photo may be shown at 407. For sporting or competition related events, a live event scoreboard may be depicted at 409. Information related to the event may be shown at 411.

According to particular embodiments, a display is configured to show multiple events. In particular embodiments, each event includes multiple options to purchase, select, view, download, review, rate, or discuss the content. In some examples, the events are scrollable using a side swipe gesture, keypad controls, numeric or text entry, etc. The events may be selected for each particular user based on user characteristics, user preferences, viewing history, purchase history, interests, real-time popularity, social network buzz, social network recommendations, etc. In other examples, tile placement is bid upon and/or purchased by content providers and advertisers, to allow presentation of selected content to viewers. In still other examples, content providers and advertisers can bid to place events in preferred positions for particular demographic groups or subscriber groups.

According to particular embodiments, a client side application may provide overlays corresponding to particular discovery mechanisms. Overlays may be partially or completely transparent, allowing a user to interact with a tile view. Overlays may be generated or predefined. In particular examples, a device receives mapping information from a provider and shows a display with overlay selection boxes. According to particular embodiments, a user navigates the overlay selection boxes and selects options by identifying a particular overlay selection such as overlay selection. The overlay selection boxes may be arranged in a variety of visual patterns. In particular examples, an overlay highlights a particular event when selected. Selecting the event in an overlay selection results in an event change to allow viewing of the corresponding video content. According to particular embodiments, the overlay has the ability to support customized advertising on channels.

Figure 5:
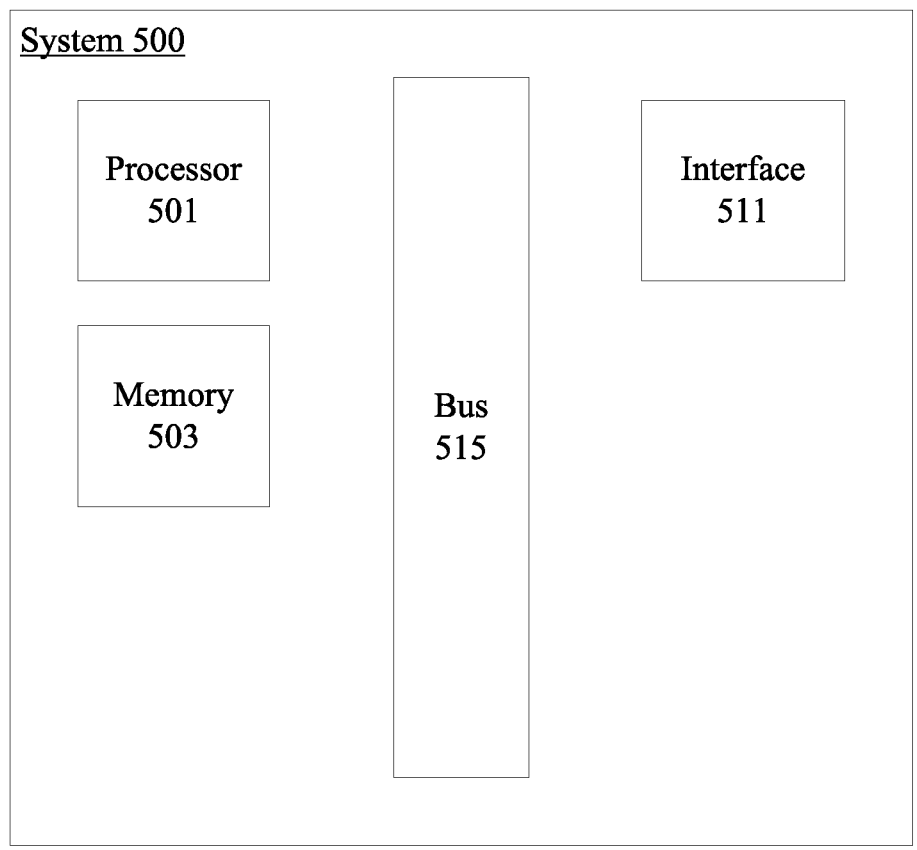
FIG. 5 illustrates an example of a computer system that can be used to implement various embodiments.

FIG. 5 provides one example of a system that can be used to implement one or more mechanisms. According to particular example embodiments, a system 500 suitable for implementing particular embodiments of the present invention includes a processor 501, a memory 503, an interface 511, and a bus 515 (e.g., a PCI bus). When acting under the control of appropriate software or firmware, the processor 501 is responsible for such tasks such as pattern generation. Various specially configured devices can also be used in place of a processor 501 or in addition to processor 501. The complete implementation can also be done in custom hardware. The interface 511 is typically configured to send and receive data packets or data segments over a network. Particular examples of interfaces the device supports include host bus adapter (HBA) interfaces, Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as data synthesis.

According to particular example embodiments, the system 500 uses memory 503 to store data, algorithms and program instructions. The program instructions may control the operation of an operating system and/or one or more applications, for example. The memory or memories may also be configured to store received data and process received data.

Because such information and program instructions may be employed to implement the systems/methods described herein, the present invention relates to tangible, machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as optical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter. Computer readable storage media refer to physical and tangible media such as disks, solid state memory, and persistent storage and excludes carrier waves.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
    receiving media content information corresponding to a plurality of events from a plurality of sources;
    sending to a device interface a plurality of dates in a scrollable dates area;
    sending to the device interface the plurality of events in a plurality of event windows, the plurality of event windows included in a scrollable events area comprising a past event, a current event, and a future event, wherein the current event is associated with a selected date in the scrollable dates area, wherein the plurality of events are represented using tiles of various sizes based on real-time popularity of various events, wherein larger tiles correspond to more popular events, wherein the plurality of events from the plurality of sources include both live events and clip content, wherein the tiles are personalized to a device user, each tile including multiple selection options, the multiple selection options including in application purchase, archive program viewing, and additional content viewing, wherein the tiles themselves can be still images, logos, or live channel feeds, wherein at least one event window contains multiple tiles;
    receiving a request from a device user to navigate to a past event depicted in one of the plurality of event windows; providing a video stream corresponding to the past event to the user.

2. The method of claim 1, wherein the current event is a featured event corresponding to the selected day.

3. The method of claim 1, wherein the current event is a currently most watched.

4. The method of claim 1, wherein the current event is a currently most watched event amongst users having the same identified interests as the device user.

5. The method of claim 1, wherein the current event is a currently most watched event amongst users in a social group associated with the device user.

6. The method of claim 1, wherein the past event, the current event, and the future event are displayed simultaneously on a device output.

7. The method of claim 6, wherein the past event and the future event occur on different days.

8. The method of claim 6, wherein the past event corresponds to a first day, the current event corresponds to a second day, and the future event corresponds to a third day.

9. The method of claim 8, wherein the first day, the second day, and the third day are highlighted in the scrollable dates area.

10. The method of claim 1, wherein the current event is a content provider selected event that is presented to users based on content provider identified characteristics.

11. The method of claim 1, wherein the future event occurs on a different day.

12. The method of claim 1, wherein the past event is a video on demand event and the current event is a live event.

13. A system, comprising:
    a device input interface configured to receive media content information corresponding to a plurality of events from a plurality of sources;
    a processor configured to send a plurality of dates in a scrollable dates area and the plurality of events in a plurality of event windows in a scrollable events area to a device output interface, wherein the scrollable events area comprises a past event, a current event, and a future event, wherein the current event is associated with a selected date in the scrollable dates area, wherein the plurality of events are represented using tiles of various sizes based on real-time popularity of various events, wherein larger tiles correspond to more popular events, wherein the plurality of events from the plurality of sources include both live events and clip content, wherein the tiles are personalized to a device user, each tile including multiple selection options, the multiple selection options including in application purchase, archive program viewing, and additional content viewing, wherein the tiles themselves can be still images, logos, or live channel feeds, wherein at least one event window contains multiple tiles;
    wherein the device input interface is further configured to receive a request from a device user to navigate to a past event depicted in one of the plurality of event windows, wherein a video stream corresponding to the past event is provided to the user.

14. The system of claim 13, wherein the current event is a featured event corresponding to the selected day.

15. The system of claim 13, wherein the current event is a currently most watched.

16. The system of claim 13, wherein the current event is a currently most watched event amongst users having the same identified interests as the device user.

17. The system of claim 13, wherein the current event is a currently most watched event amongst users in a social group associated with the device user.

18. The system of claim 13, wherein the past event, the current event, and the future event are displayed simultaneously on a device output.

19. The system of claim 18, wherein the past event and the future event occur on different days.

20. A non-transitory computer readable medium, comprising:
- computer code for receiving media content information corresponding to a plurality of events from a plurality of sources;
- computer code for sending to a device interface a plurality of dates in a scrollable dates area;
- computer code for sending to device interface the plurality of events in a plurality of event windows, the plurality of event windows included in a scrollable events area comprising a past event, a current event, and a future event, wherein the current event is associated with a selected date in the scrollable dates area, wherein the plurality of events are represented using tiles of various sizes based on real-time popularity of various events, wherein larger tiles correspond to more popular events, wherein the plurality of events from the plurality of sources include both live events and clip content, wherein the tiles are personalized to a device user, each tile including multiple selection options, the multiple selection options including in application purchase, archive program viewing, and additional content viewing, wherein the tiles themselves can be still images, logos, or live channel feeds, wherein at least one event window contains multiple tiles;
- computer code for receiving a request from a device user to navigate to a past event depicted in one of the plurality of event windows;
- computer code for providing a video stream corresponding to the past event to the user.

* * * * *